(12) United States Patent
Feng et al.

(10) Patent No.: US 9,471,143 B2
(45) Date of Patent: Oct. 18, 2016

(54) USING HAPTIC FEEDBACK ON A TOUCH DEVICE TO PROVIDE ELEMENT LOCATION INDICATIONS

(71) Applicant: Lenovo (Singapore) Pte. Ltd., New Tech Park (SG)

(72) Inventors: Xin Feng, Arcadia, CA (US); Carlos Munoz-Bustamante, Durham, NC (US)

(73) Assignee: Lenovo (Singapore) Pte. Ltd, New Tech Park (SG)

( * ) Notice: Subject to any disclaimer, the term of this patent is extended or adjusted under 35 U.S.C. 154(b) by 123 days.

(21) Appl. No.: 14/159,225

(22) Filed: Jan. 20, 2014

(65) Prior Publication Data

US 2015/0205353 A1 Jul. 23, 2015

(51) Int. Cl.
*G06F 3/01* (2006.01)
*G06F 3/0488* (2013.01)

(52) U.S. Cl.
CPC ............ *G06F 3/016* (2013.01); *G06F 3/0488* (2013.01)

(58) Field of Classification Search
CPC .. G06F 3/03547; G06F 3/041; G06F 3/0412; G06F 3/0414; G06F 3/046; G06F 3/047; G06F 3/044; G06F 3/045; G06F 3/043; G06F 3/0433; G06F 3/0436; G06F 2203/041; G06F 2203/04107; G06F 2203/04111; G06F 2203/04112; G06F 2203/04113; G06F 3/016; G06F 3/0488
See application file for complete search history.

(56) References Cited

U.S. PATENT DOCUMENTS

| | | | |
|---|---|---|---|
| 8,022,933 B2 | 9/2011 | Hardacker et al. | |
| 2006/0238510 A1 | 10/2006 | Panotopoulos et al. | |
| 2009/0033617 A1 | 2/2009 | Lindberg et al. | |
| 2012/0249474 A1* | 10/2012 | Pratt et al. | 345/174 |
| 2013/0050135 A1 | 2/2013 | Stewart et al. | |
| 2013/0275082 A1 | 10/2013 | Follmer et al. | |

OTHER PUBLICATIONS

Xin Feng, Peter Carlson Rane, "Actuating Haptic Element of a Touch-Sensitive Device", file history of related U.S. Appl. No. 14/159,619, filed Jan. 21, 2014.
Xin Feng, Peter Carlson Rane, "Actuating Haptic Element of a Touch-Sensitive Device", related U.S. Appl. No. 14/159,619, Non-Final Office Action dated Jun. 16, 2015.
Xin Feng, Peter Carlson Rane, "Actuating Haptic Element of a Touch-Sensitive Device", related U.S. Appl. No. 14/159,619, Applicant's response to Non-Final Office Action filed Jun. 23, 2015.
Xin Feng, Peter Carlson Rane, "Actuating Haptic Element on a Touch-Sensitive Device", file history of related U.S. Appl. No. 14/819,826, filed Aug. 6, 2015.

* cited by examiner

*Primary Examiner* — Lun-Yi Lao
*Assistant Examiner* — Jarurat Suteerawongsa
(74) *Attorney, Agent, or Firm* — John L. Rogitz; John M. Rogitz

(57) ABSTRACT

Haptic feedback is used on a device to give a indications as to the location and/or function of user interface (UI) elements presented on the screen of the device.

23 Claims, 5 Drawing Sheets

USING HAPTIC FEEDBACK ON A TOUCH DEVICE TO PROVIDE ELEMENT LOCATION INDICATIONS

FIELD

The present application relates generally to using haptic feedback on a device to provide input element location indications.

BACKGROUND

Input elements on user interfaces (UIs) may be difficult to locate particularly for visually impaired users. In particular, such users may encounter difficulty where the controls are, navigating the screen, and inputting information, yet the action of the input element nonetheless is triggered as soon as such a user touches the screen.

SUMMARY

Accordingly, in a first aspect an apparatus includes a processor, a touch-enabled display in communication with the processor, a haptic element in communication with the processor, and a memory accessible to the processor. The memory bears instructions executable by the processor to determine a user's body portion is proximate but not in physical contact with a first region on the touch-enabled display, and generate first haptic feedback using the haptic element having at least a first tactile characteristic responsive to a determination that the user's body portion is proximate but not in physical contact with the first region.

In another aspect, a method includes, responsive to invoking a user interface (UI) having at least first and second touch-selectable elements on a display, outputting at least first and second initial tactile feedback signals respectively indicating locations of the first and second elements. The method also includes, subsequent to outputting the initial tactile feedback signals and responsive to determining that a user body portion hovers over the first element, outputting the first tactile feedback signal but not the second tactile feedback signal.

In another aspect, an apparatus includes a housing, a touch-enabled display disposed on a first side of the housing, a processor operatively coupled to the touch-enabled screen, and a haptic layer disposed on a second side of the housing. The second side is the side opposite to the first side, and the haptic layer covers an area at least substantially the size of the area of the touch-enabled screen.

In still another aspect, a method includes determining a body portion is proximate but not in physical contact with a first region on a touch-enabled display of an apparatus, and generating first haptic feedback at the apparatus using a haptic element responsive to determining that the body portion is proximate but not in physical contact with the first region. The first haptic feedback has at least a first tactile characteristic.

The details of present principles, both as to their structure and operation, can best be understood in reference to the accompanying drawings, in which like reference numerals refer to like parts, and in which:

BRIEF DESCRIPTION OF THE DRAWINGS

FIG. 3 is a perspective view of an information processing apparatus according to present principles embodied as a tablet computer with touch sensitive display, with the haptic layer shown in an exploded relationship with the display, it being understood that present principles also apply to providing haptic feedback for, e.g., smart phones and the like;

DETAILED DESCRIPTION

Figure 1:
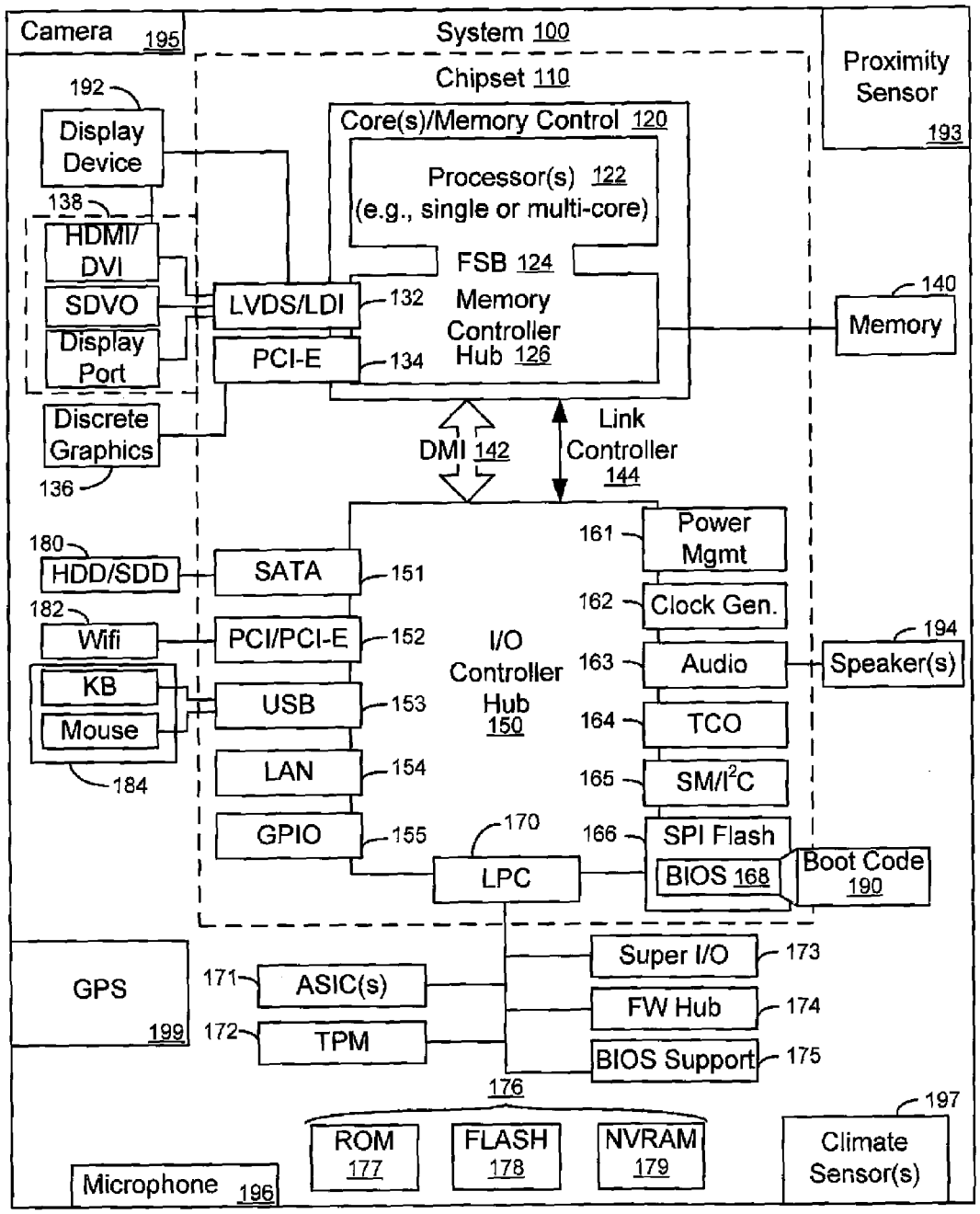
FIG. 1 is a block diagram of an example device in accordance with present principles.

This disclosure relates generally to (e.g. consumer electronics (CE)) device based user information. With respect to any computer systems discussed herein, a system may include server and client components, connected over a network such that data may be exchanged between the client and server components. The client components may include one or more computing devices including televisions (e.g. smart TVs, Internet-enabled TVs), computers such as laptops and tablet computers, and other mobile devices including smart phones. These client devices may employ, as non-limiting examples, operating systems from Apple, Google, or Microsoft. A Unix operating system may be used. These operating systems can execute one or more browsers such as a browser made by Microsoft or Google or Mozilla or other browser program that can access web applications hosted by the Internet servers over a network such as the Internet, a local intranet, or a virtual private network.

As used herein, instructions refer to computer-implemented steps for processing information in the system. Instructions can be implemented in software, firmware or hardware; hence, illustrative components, blocks, modules, circuits, and steps are set forth in terms of their functionality.

A processor may be any conventional general purpose single- or multi-chip processor that can execute logic by means of various lines such as address lines, data lines, and control lines and registers and shift registers. Moreover, any logical blocks, modules, and circuits described herein can be implemented or performed, in addition to a general purpose processor, in or by a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

Any software and/or applications described by way of flow charts and/or user interfaces herein can include various sub-routines, procedures, etc. It is to be understood that logic divulged as being executed by e.g. a module can be redistributed to other software modules and/or combined together in a single module and/or made available in a shareable library.

Logic when implemented in software, can be written in an appropriate language such as but not limited to C# or C++, and can be stored on or transmitted through a computer-readable storage medium (e.g. that may not be a carrier wave) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc.

A connection may establish a computer-readable medium. Such connections can include, as examples, hard-wired cables including fiber optics and coaxial wires and twisted pair wires. Such connections may include wireless communication connections including infrared and radio.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C'") includes systems that have A alone, B alone, C alone, A and B together, A and C together, B and C together, and/or A, B, and C together, etc.

"A system having one or more of A, B, and C" (likewise "a system having one or more of A, B, or C" and "a system having one or more of A, B, C'") includes systems that have A alone, B alone, C alone, A and B together, A and C together, B and C together, and/or A, B, and C together, etc.

The term "circuit" or "circuitry" is used in the summary, description, and/or claims. As is well known in the art, the term"circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now in reference to FIG. 1, it shows an example block diagram of an example computer system 100 such as e.g. an Internet enabled, computerized telephone (e.g. a smart phone), a tablet computer, a notebook or desktop computer, an Internet enabled computerized wearable device such as a smart watch, a computerized television (TV) such as a smart TV, so-called "convertible" devices such as e.g. a tablet that may be converted to a laptop by virtue of being connected to a soft keyboard, and/or other smart devices, etc. Thus, in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100.

As shown in FIG. 1, the system 100 includes a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the conventional"northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 further includes a low-voltage differential signaling interface (LVDS) 132. The LVDS 132 may be a so-called LVDS Display Interface (LDI) for support of a display device 192 (e.g., a CRT, a flat panel, a projector, a touch-enabled display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (×16) PCI-E port for an external PCI-E-based graphics card (including e.g. one of more CPUs). An example system may include AGP or PCI-E for support of graphics.

The I/O hub controller 150 includes a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 provide for communication with various devices, networks, etc. For example, the SATA interface 151 provides for reading, writing or reading and writing information on one or more drives 180 such as HDDs, SDDs or a combination thereof, but in any case the drives 180 are understood to be e.g. tangible computer readable storage mediums that may not be carrier waves. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

In addition to the foregoing, the system 100 also may include sensors and/or a sensor array including e.g. a proximity, infrared, sonar, and/or heat sensor 193 providing input to the processor 122 and configured in accordance with present principles for sensing e.g. body heat of a person and/or the proximity of at least a portion of the person to at least a portion of the system 100 such as the sensor 193 itself. Also in some embodiments, the system 100 may include one or more cameras 195 providing input to the processor 122. The camera 195 may be, e.g., a thermal imaging camera, a digital camera such as a webcam, and/or a camera integrated into the system 100 and controllable by the processor 122 to gather pictures/images and/or video. Moreover, the system 100 may include an audio receiver/microphone (e.g. a microphone or microphone array) 196 for e.g. entering input such as a command to the system 100 in accordance with present principles.

In addition to the foregoing, the system 100 may include one or more climate sensors 197 (such as e.g., an (e.g. ambient) light sensor, a temperature sensor, a humidity sensor, and/or an environmental sensor) providing input to the processor 122 in accordance with present principles. The system 100 may also include one or more motion sensors 198 (such as e.g., an accelerometer and/or a gesture sensor (e.g. for sensing gestures in free space associated by the device with commands in accordance with present principles), etc.) providing input to the processor 122 in accordance with present principles. Though not shown, still other sensors may be included and their output used in accordance with present principles, such as e.g. biometric sensors, sound sensors, orientation sensors, location sensors, scan sensors, and/or time sensors. Also note that a GPS transceiver 199 is shown that is configured to e.g. receive geographic position information from at least one satellite and provide the information to the processor 122. However, it is to be understood that another suitable position receiver other than a GPS receiver may be used in accordance with present principles to e.g. determine the location of the system 100.

Figure 2:
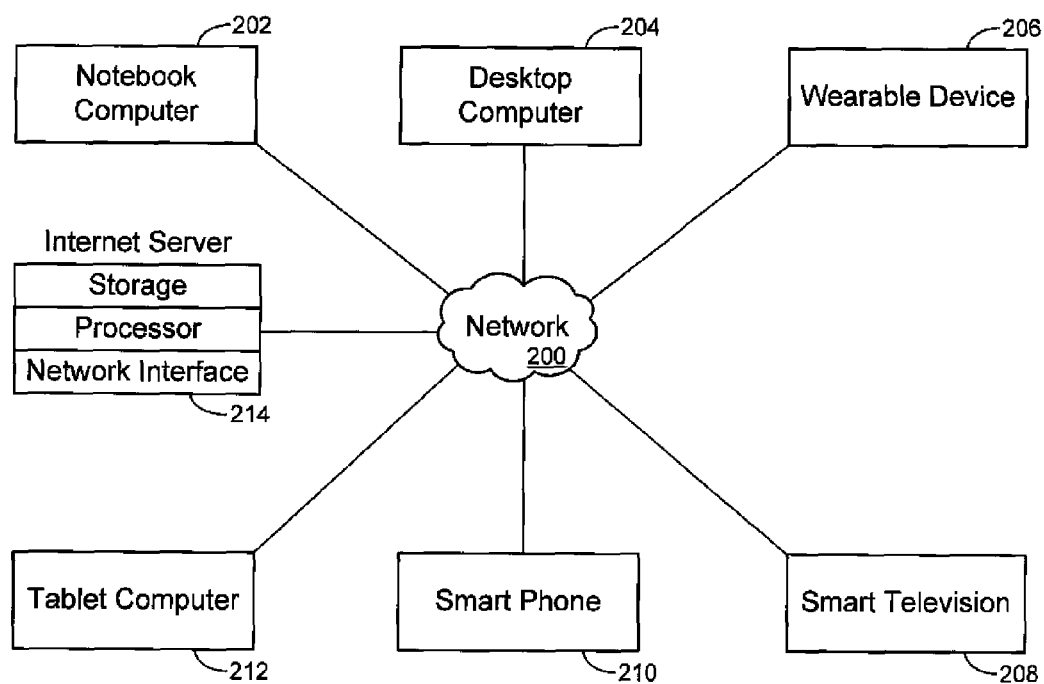
FIG. 2 is a block diagram of a network of devices in accordance with present principles.

Before moving on to FIG. 2 and as described herein, it is to be understood that an example device or other machine/computer may include fewer or more features than shown on the system 100 of FIG. 1. In any case, it is to be understood at least based on the foregoing that the system 100 is configured to undertake present principles.

Turning now to FIG. 2, it shows example devices communicating over a network 200 such as e.g. the Internet in accordance with present principles is shown. It is to be understood that e.g. each of the devices described in reference to FIG. 2 may include at least some of the features, components, and/or elements of the system 100 described above. In any case, FIG. 2 shows a notebook computer 202, a desktop computer 204, a wearable device 206 such as e.g. a smart watch, a smart television (TV) 208, a smart phone 2120, a tablet computer 212, and a server 214 in accordance with present principles such as e.g. an Internet server that may e.g. provide cloud storage accessible to the devices 202-212. It is to be understood that the devices 202-214 are configured to communicate with each other over the network 200 to undertake present principles.

Figure 3:
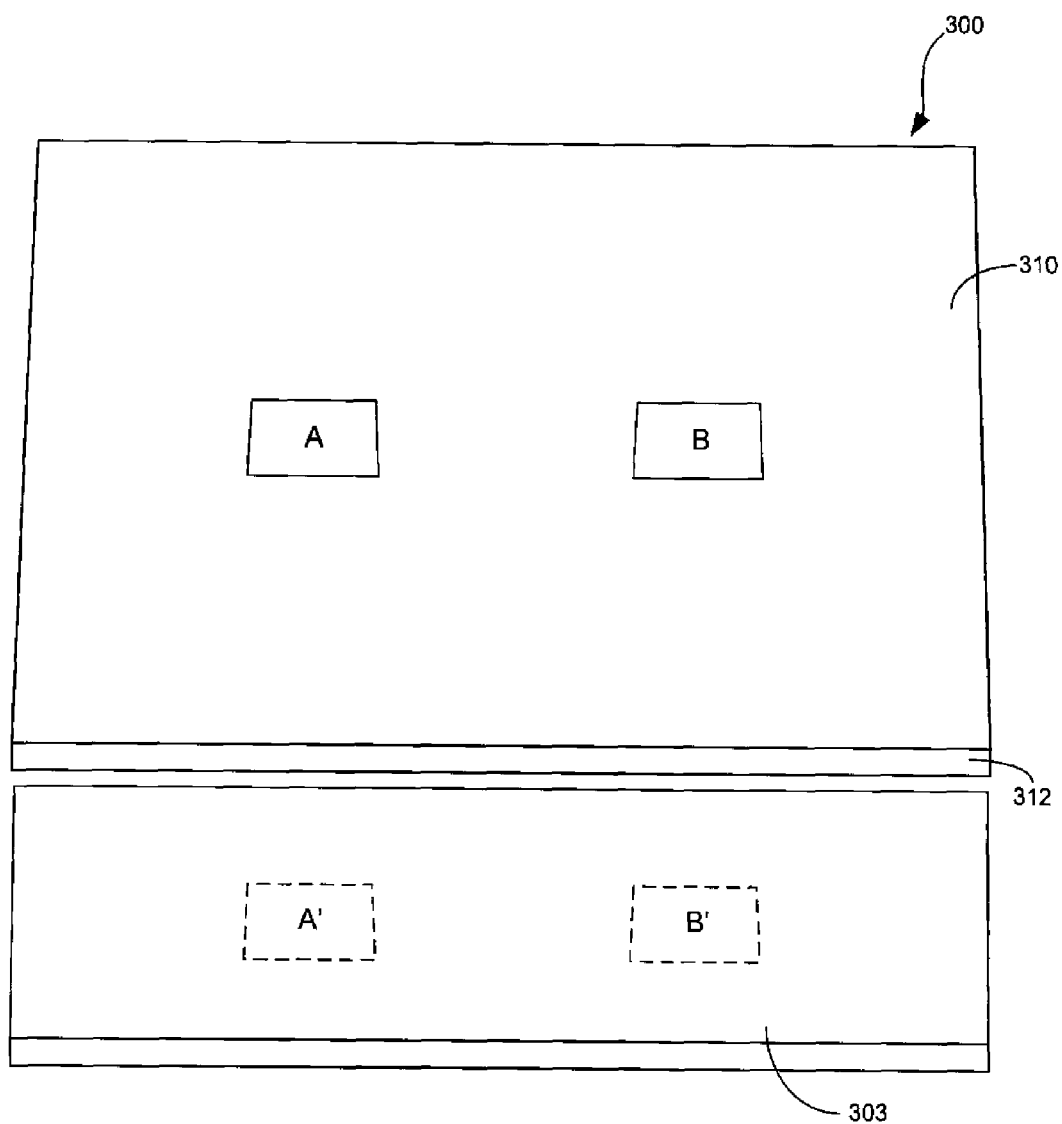

Referring to FIG. 3, an embodiment provides an information handling device 300 with a touchable display area 310. The device 300 shown in FIG. 3 is a tablet computer, it being understood that present principles apply to other devices such as smart phones with touch sensitive displays.

The touchable display area 310 includes both visible output elements such as matrix-type display elements and also includes a touch-based sensing layer typically underneath the display elements (relative to a user looking at the display), although in some embodiments a transparent sensing layer may be provided on top of the display elements. The sensing layer may be embodied by, e.g., a capacitive touch based layer as, by way of example, inclusion of copper and/or printed ink and/or Indium tin oxide (ITO) capacitive traces. Note that the sensing layer may output signals representative not only of direct contact with the display area 310 but also representative of proximity of a hand or finger to the display area 310. The difference between determining a direct touch has occurred and a close proximity (but not touching) of a finger with the display area 310 has occurred may be made based on, e.g., the amplitude of the signal output by the touch sensing layer, with output amplitudes below a threshold being interpreted as non-touch but proximate hover and output amplitudes above a threshold being interpreted as direct touches against the display area 310.

In any case, a haptic layer 303 is also provided on the device 300, in the example shown, under the display elements, on or near the back panel 312 of the apparatus. The back panel is the flat panel opposite the display portion. The haptic layer may be provided just under the touch sensing layer if desired, or between the touch sensing layer and the display elements. The haptic layer may be made of material or parts available from vendors such as the Touchsense® line of products vended by Immersion Corp., which provides touch-based feedback.

As is to be appreciated in reference to FIG. 3, only portions of the haptic layer 303 may be activated at one time to provide tactile feedback to a user. For example, when the display elements present visible selectable input elements "A" and "B" that can be touched to be sensed by the touch sensing layer to input commands correlated to the input elements, the haptic layer 303 may include two separately activatable regions "A prime" and "B prime" directly under the visible display elements "A" and "B" that can be respectively activated according to disclosure below to tactiley indicate to a user holding the back of the display that input elements "A" and "B", respectively, are being presented on the opposite (display) side of the display. While FIG. 3 shows a continuous haptic layer 303, it is to be understood that in some implementations multiple discrete haptic elements may be provided in the region encompassed by the layer 303 illustrated in FIG. 3.

Figure 4:
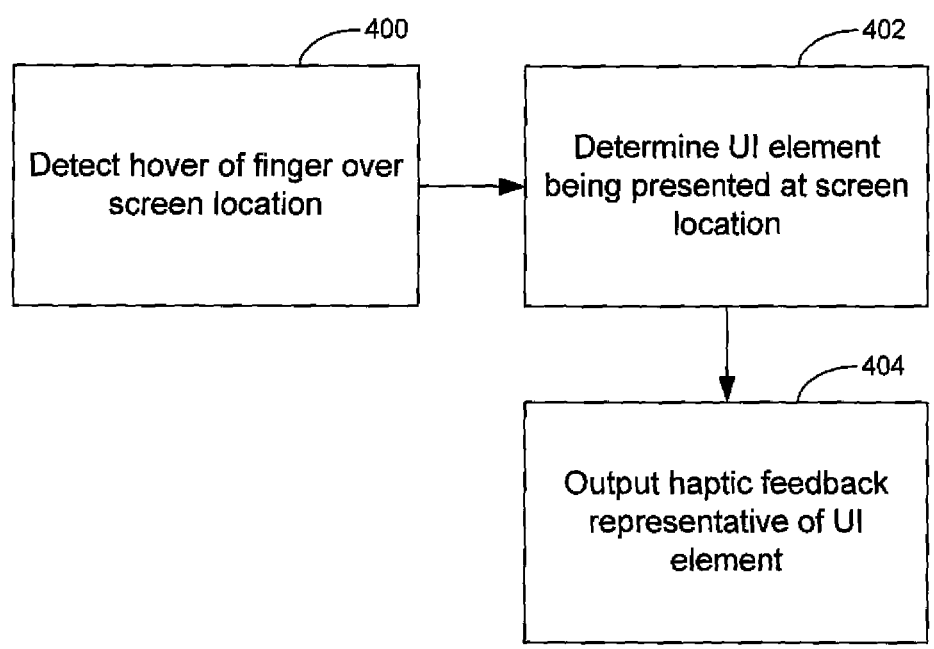
FIG. 4 is a flow chart showing example logic.
Figure 5:
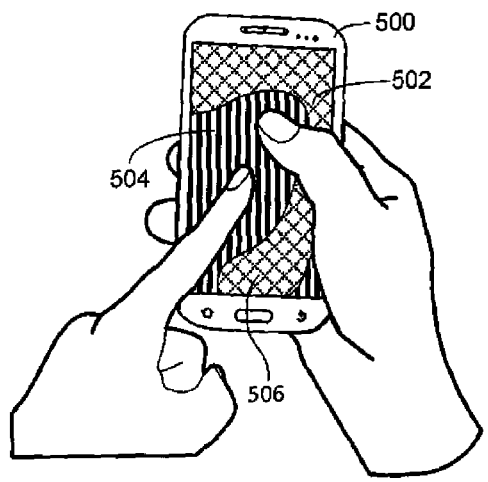
FIGS. 5, 6A, 6B, and 7 are schematic views illustrating example applications.

FIG. 4 at block 400 shows that a user's finger may be detected to hover over a screen location. The non-touch proximity of the user's finger may be determined as mentioned previously. At block 402 it is determined by the device processor what user interface (UI) element is being presented at the location sensed in block 400, which causes the logic to flow to block 404 to output, using the haptic layer 303 in FIG. 3, tactile indication to the user that may be unique to or otherwise be tailored to indicate the nature and/or use of the UI element determined at block 402. In FIG. 5, for example, a device 500 presents three UI regions 502, 504, 506, with the user's finger hovering over the middle region 504. A tactile indication is generated in response indicating the nature or use or other attribute of the middle region 504. Respective other tactile responses, all different from each other, may be output when the user's finger hovers the other respective regions 502, 506.

The respective haptic signals output may be characterized by respective combinations of locations on the back of the device, magnitudes, vibrational frequencies, and durations so that the user can identify the layout of the UI, e.g., the location of various UI buttons.

By way of non-limiting example:

| Haptic Location | Corresponding UI element | Magnitude/Frequency/Duration |
|---|---|---|
| Bottom right | Launch browser | low/low/short |
| Bottom left | Launch email | low/low/long |
| Top right | Select button | high/low/short |
| Top left | Back button | high/high/short |

Figure 6A:
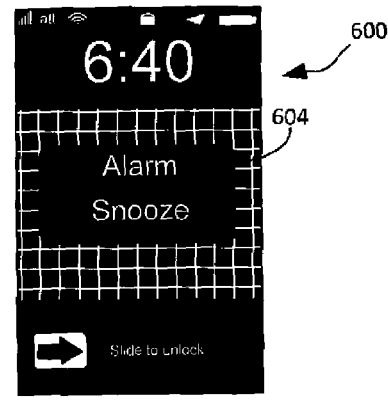
Figure 6B:
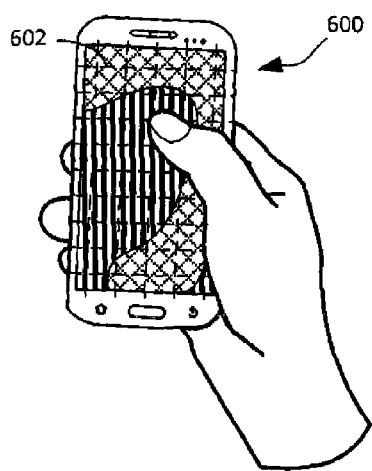

FIGS. 6A and 6B illustrate a device 600, with FIG. 6B schematically showing grid lines 602 whose intersections indicate discrete locations on the back of the device at which haptic feedback is provided, potentially with different tactile attributes at each discrete location. When there is an alert as shown in FIG. 6A at alarm UI element 604, the haptics layer 303 is generated to provide tactile feedback with characteristics that indicate an alert. The feedback may be provided on the back of the device 600 preferably directly underneath the UI element 604. The user can use the tactile feedback as a cue in locating the alarm UI element 604.

In some embodiments, haptics may be used to provide cues where UI buttons are located. These haptics may be automatically provided (without detecting a finger hover) when the buttons initially are rendered on the UI, e.g., the tactile feedback signals may be provided in sequence until the feedback for each button has been generated in the respective different locations on the back of the device. On a second level and as mentioned above, the haptic feedback for a UI element may be generated a second time whenever a user hovers his or her finger over the UI element. In some embodiments, the haptics feedback for any particular UI element may be limited to N occurrences within a period, wherein N is an integer greater than zero. For example, haptic feedback may be provided for a particular UI element only the first two times the user hovers his finger over that element, and thereafter may not be provided for that element during subsequent finger hoverings over that element. The period may be a clock period, e.g., one day, or a user period, e.g., the period during which the particular UI is presented on the display.

Figure 7:
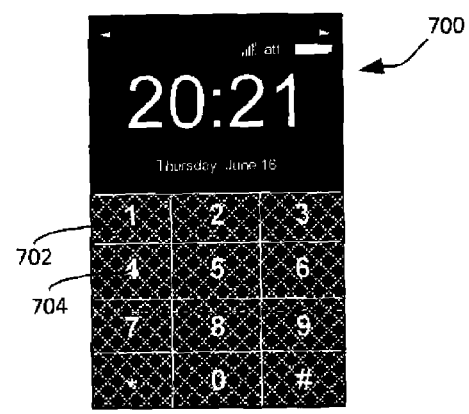

FIG. 7 shows a device 700 presented a UI 702 with multiple UI elements 704. When a user hovers his finger over one of the elements 704, a respective haptic feedback signal is generated preferably directly underneath the element being hovered over to assist the user in locating the element. Other assistive technology such as screen readers may also be used in parallel with the haptic feedback.

Without reference to any particular figure, it is to be understood that haptic actuators for generating haptic feedback in accordance with present principles may include but are not limited to e.g. mechanical ones (e.g. with four different actuators at four respective corners, and/or e.g. that may be programmed with different magnitudes to mimic local area feedback e.g. even if not at the corner per se), electronic-based ones (e.g. that generate friction and/or resistance between a user's e.g. finger and a film on the device that is an electric conductor), and/or dynamic buttons.

Also without reference to any particular figure, note that a haptic element and/or layer in accordance with present principles that is arranged on a device may be e.g. disposed on a side of the housing of the device (e.g. other than a side bearing the device's touch-enabled display), and that the haptic element and/or layer may cover an area at least substantially the size of the area of the touch-enabled screen such as e.g. covering at least seventy five percent of the (e.g. surface) area of the touch-enabled screen. In addition to or in lieu of the foregoing, the haptic element and/or layer may be configured in dimensions at least substantially the length of respective dimensions of the touch-enabled screen such as e.g., extending to at least seventy five percent of each respective dimension of the touch-enabled display screen (e.g. seventy five percent of the surface dimensions and/or dimensions of the display screen facing outwardly away from the device and opposite the haptic element and/or layer when the haptic element and/or layer is juxtaposed on the back of the device relative to the display screen).

While the particular USING HAPTIC FEEDBACK ON A TOUCH DEVICE TO PROVIDE ELEMENT LOCATION INDICATIONS is herein shown and described in detail, it is to be understood that the subject matter which is encompassed by the present application is limited only by the claims.

What is claimed is:

1. An apparatus, comprising:
a first side and a second side;
at least one memory that is not a transitory signal and that comprises instructions executable by at least one processor to:
determine a user's body portion is proximate but not in physical contact with a first region on a touch-enabled display controlled by the at least one processor and disposed on the first side;
responsive to a determination that the user's body portion is proximate but not in physical contact with the first region, generate first haptic feedback using a haptic element controlled by the at least one processor and the first haptic feedback having at least a first tactile characteristic; and
generate the first haptic feedback at the second side upon an invocation of a user interface (UI) without first determining that the body portion is hovering over the UI.

2. The apparatus of claim 1, wherein the first tactile characteristic comprises magnitude.

3. The apparatus of claim 1, wherein the first tactile characteristic comprises frequency.

4. The apparatus of claim 1, wherein the first tactile characteristic comprises duration.

5. The computer readable storage medium of claim 1, wherein the instructions are executable to:

determine a user's body portion is proximate to a second region the touch-enabled display of the apparatus; and responsive to a determination that the users body portion is proximate to the second region, generate second haptic feedback using the haptic element having at least a second tactile characteristic;

wherein the second tactile characteristic is different from the first tactile characteristic.

6. The apparatus of claim 5, wherein the first haptic feedback is correlated to the first region, and wherein the second haptic feedback is correlated to the second region.

7. The computer readable storage medium of claim 5, wherein the instructions are executable to generate the respective first and second haptic feedbacks directly under the respective first and second regions.

8. A method, comprising:

responsive to invoking a user interface (UI) having at least first and second touch-selectable elements presented on a display, outputting at least first and second tactile feedback signals respectively indicating locations of the first and second elements, wherein the display is disposed on a first side of a device and wherein the first and second tactile feedback signals are output at a second side of the device; and subsequent to outputting the first and second tactile feedback signals, responsive to determining that a user body portion hovers over the first element, outputting the first tactile feedback signal but not the second tactile feedback signal.

9. The method of claim 8, wherein the first tactile feedback signal has at least a first tactile characteristic and the second tactile feedback signal has at least a second tactile characteristic different from the first tactile characteristic.

10. The method of claim 9, wherein the first tactile characteristic comprises magnitude.

11. The method of claim 9, wherein the first tactile characteristic comprises frequency.

12. The method of claim 9, wherein the first tactile characteristic comprises duration.

13. The method of claim 8, wherein the first tactile feedback signal is correlated to the first element and the second tactile feedback signal is correlated to the second element.

14. The method of claim 8, comprising generating the respective first and second tactile feedback signals directly under the respective first and second elements.

15. An apparatus comprising:

at least one processor that controls at least one touch-enabled display disposed at a first side of the apparatus and that controls at least one haptic layer disposed at a second side of the apparatus, the haptic layer being operatively associated with the at least one touch-enabled display to generate a tactile signal thereon; and at least one memory that is not a transitory signal and that comprises instructions executable by the at least one processor to:

determine a user's body portion is proximate but not in physical contact with a first region on the touch-enabled display;

responsive to a determination that the user's body portion is proximate but not in physical contact with the first region, generate first haptic feedback using the haptic layer; and also generate the first haptic feedback responsive to at least one invocation of a user interface (UI) regardless of determining location of the body portion.

16. The apparatus of claim 15, wherein the instructions are executable by the at least one processor to:

determine a user's body portion is proximate but not in physical contact with the first region on the touch-enabled display;

responsive to a determination that the user's body portion is proximate but not in physical contact with the first region, generate first haptic feedback using the haptic layer having at least a first tactile characteristic.

17. The apparatus of claim 16, wherein the instructions are executable by the at least one processor to:

determine a user's body portion is proximate to a second region the touch-enabled display; and responsive to a determination that the user's body portion is proximate to the second region, generate second haptic feedback using the haptic element having at least a second tactile characteristic;

wherein the second tactile characteristic is different from the first tactile characteristic.

18. The apparatus of claim 17, wherein the first haptic feedback is correlated to the first region, and the second haptic feedback is correlated to the second region.

19. The apparatus of claim 17, wherein the instructions are executable by the at least one processor to generate the respective first and second haptic feedbacks directly under the respective first and second regions.

20. The apparatus of claim 15, comprising the touch-enabled display and the haptic layer.

21. The apparatus of claim 20, wherein the second side is opposite to the first side, and wherein the haptic layer covers an area at least substantially the area of the touch-enabled display.

22. A method, comprising:

determining a body portion is proximate but not in physical contact with a first region on a touch-enabled display disposed at a first side of an apparatus;

responsive to determining that the body portion is proximate but not in physical contact with the first region, generating first haptic feedback at the apparatus using a haptic element disposed at a second side of the apparatus, the first haptic feedback having at least a first tactile characteristic; and also generating the first haptic feedback upon an invocation of a user interface (UI) without first determining that the body portion is hovering over the UI.

23. The method of claim 22, further comprising:

determining a body portion is proximate to a second region of the touch-enabled display of the apparatus; and responsive to determining that the body portion is proximate to the second region, generating second haptic feedback using the haptic element, the second haptic feedback having at least a second tactile characteristic different from the first tactile characteristic.

* * * * *